(12) United States Patent
Bonin et al.

(10) Patent No.: US 6,829,119 B2
(45) Date of Patent: Dec. 7, 2004

(54) DISC DRIVE MICROACTUATOR WITH LATERAL POSITION SENSOR

(75) Inventors: Wayne A. Bonin, North Oaks, MN (US); Peter Crane, St. Paul, MN (US); Zine-Eddine Boutaghou, Vadnais Heights, MN (US); Roger L. Hipwell, Jr., Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 240 days.

(21) Appl. No.: 10/279,404

(22) Filed: Oct. 24, 2002

(65) Prior Publication Data

US 2004/0080861 A1 Apr. 29, 2004

(51) Int. Cl.[7] .............................. G11B 5/596; G11B 5/55
(52) U.S. Cl. ................................. 360/78.12; 360/78.05
(58) Field of Search ........................ 360/78.12, 78.03, 360/294.4, 294.3, 294.2, 235.7; 318/632, 599; 310/309, 339

(56) References Cited

U.S. PATENT DOCUMENTS

| | | | |
|---|---|---|---|
| 5,237,284 A | 8/1993 | Van Der Valk | 324/662 |
| 5,834,864 A | 11/1998 | Hesterman et al. | 310/40 |
| 5,936,411 A | 8/1999 | Jacobsen et al. | 324/662 |
| 5,998,906 A | 12/1999 | Jerman et al. | 310/309 |
| 6,122,149 A | 9/2000 | Zhang et al. | 360/294.5 |
| 6,259,584 B1 | 7/2001 | Cini et al. | 360/294.6 |
| 6,304,091 B1 | 10/2001 | Shahoian et al. | 324/662 |
| 6,366,416 B1 | 4/2002 | Meyer et al. | 360/25 |
| 2001/0032508 A1 * | 10/2001 | Lemkin et al. | 73/514.32 |

* cited by examiner

*Primary Examiner*—Sinh Tran
*Assistant Examiner*—Mitchell Slavitt
(74) *Attorney, Agent, or Firm*—Westman, Champlin & Kelly (57) ABSTRACT

A read/write head microactuator includes first and second insulating deposits that are flat, spaced apart by an air gap, and laterally movable responsive to a microactuator electrical drive current. First and second flat, interdigitated drive electrode deposits are deposited on the first insulating deposit. A flat, digitated sense electrode deposit is deposited on the second insulating deposit. The sense electrode deposit provides a relative position output. The sense electrode deposit faces both the drive electrode deposits across the air gap.

25 Claims, 7 Drawing Sheets

DISC DRIVE MICROACTUATOR WITH LATERAL POSITION SENSOR

FIELD OF THE INVENTION

The invention relates to positioning read/write heads in disc drives. In particular, the invention relates to microactuators that are used to position read/write heads in a disc drive.

BACKGROUND OF THE INVENTION

Disc drive heads are typically positioned by the combined action of a voice coil motor and a microactuator. The microactuator is typically located at the distal end of a suspension and provides a smaller amplitude, but higher bandwidth lateral motion compared to the lateral motion provided by the voice coil motor. Various types of feedback from the microactuator to a controller have been used to improve control of the microactuator position.

Magnetic velocity coils have been used to provide feedback from microactuators, but these coils provide only an indication of microactuator velocity, while the relative position of the microactuator is not available to the controller.

Capacitive sensors have been used in microactuators to provide feedback of relative position outputs, however, there are problems with capacitive sensors. The electronic sensing circuitry for capacitive sensing is mounted to the disc drive housing and leads are run between the capacitive sensor and the sensing circuitry. The leads introduce stray capacitance and noise, making the sensing inaccurate. In order to overcome the problems with inaccuracy, capacitive sensors are used that have large sensing capacitances. In order to achieve these large sensing capacitances in the limited space available in a microactuator, complex, interleaved grooved structures are etched. The grooved structures are expensive and time-consuming to micromachine and difficult to align.

There is a need for a microactuator with a capacitive relative position sensor, and associated capacitive sensing circuitry, that can be produced at low cost and provide a relative position output that is accurate in the presence of noise and stray capacitance.

SUMMARY OF THE INVENTION

Disclosed is a microactuator for mounting on a suspension for positioning a read/write head in a disc drive. The microactuator comprises a first microactuator component having a mounting surface adapted to mount on the suspension, and a second microactuator component having a mounting opening adapted to receive the read/write head.

The first and second microactuator components include corresponding first and second insulating deposits that are flat and spaced apart from one another by an air gap. The first and second insulating deposits are laterally movable relative to one another responsive to a microactuator electrical drive current.

The microactuator also comprises first and second drive electrode deposits that are flat and interdigitated. The drive electrode deposits have corresponding first and second contact pads adapted to receive first and second electrode drive voltages. A sense electrode deposit is flat and digitated. The sense electrode deposit has a sense contact pad providing a relative position output. The drive and the sense electrode deposits are disposed on the insulating deposits with the sense electrode deposit facing both the drive electrode deposits across the air gap.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments described below, a microactuator provides capacitive sensing of a relative position of a microactuator using flat electrodes that are deposited on flat insulating deposits within the microactuator. The difficulty and cost of manufacturing a microactuator using deep reactive ion etch (DRIE) to etch grooves for the capacitive structure is avoided. The flat electrode structure can be produced at low cost and provide a relative position output that is accurate in the presence of noise and stray capacitance. A flat sense electrode deposit faces two flat drive electrode deposits across a narrow air gap. As the sense electrode deposit moves laterally relative to the drive electrode deposits, capacitive coupling to one drive electrode deposit increases, while capacitive coupling to the other drive electrode deposit decreases. The sense electrode deposit provides a relative position output that is fed back to a controller to improve control of the microactuator. The feedback provided by the relative position output allows full advantage to be taken of high stroke, high bandwidth actuators. The relative position output allows a more robust and higher performance servo controller system. In one preferred arrangement, the drive levels are adjusted to reduce the relative position output to zero, so that stray capacitance does not affect the relative position measurement. Examples of arrangements of the microactuator and associated circuitry are described below in connection with FIGS. 1–7.

Figure 1:
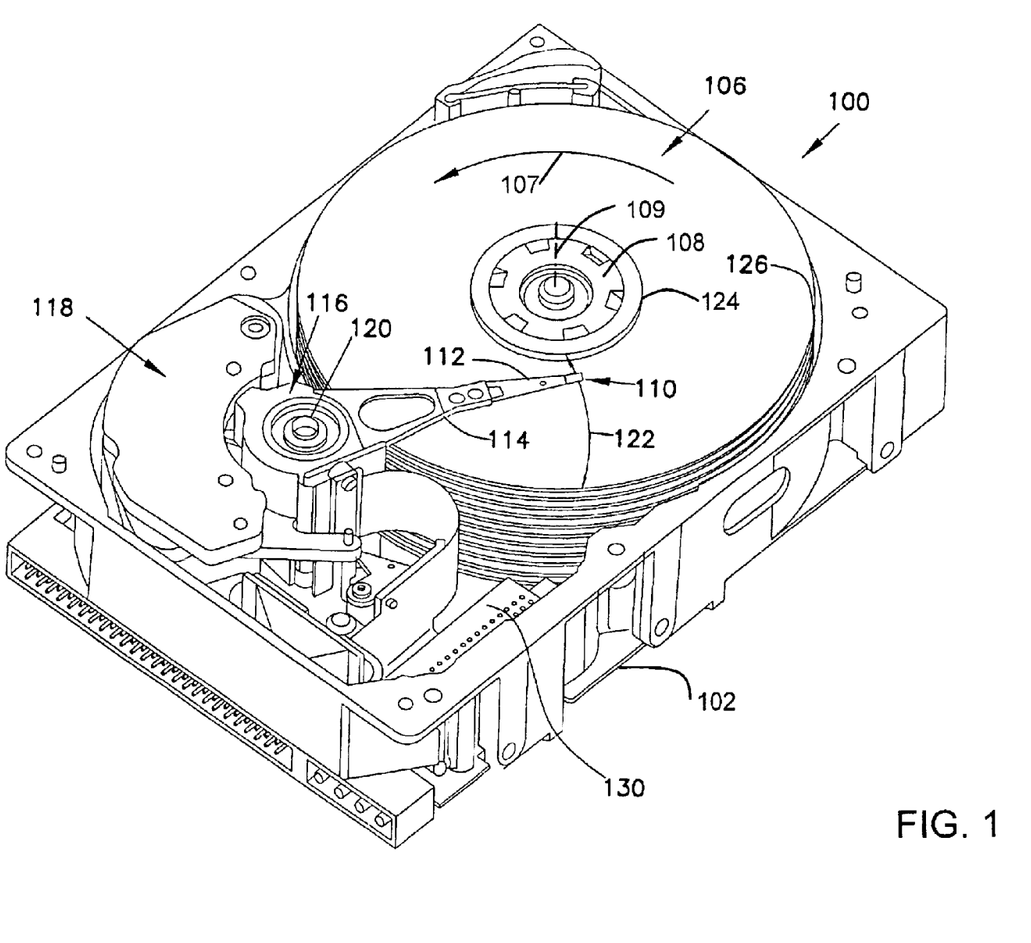
FIG. 1 illustrates an oblique view of a disc drive.

FIG. 1 is an oblique view of a disc drive 100 that includes a microactuator (not separately illustrated in FIG. 1) providing a relative position output. Disc drive 100 includes a housing with a base 102 and a top cover (not shown). Disc drive 100 further includes a disc pack 106, which is mounted on a spindle motor (not shown) by a disc clamp 108 and spun in a direction indicated by an arrow 107. Disc pack 106 includes a plurality of individual discs, which are mounted for co-rotation about a central axis 109. Each disc surface has an associated disc head slider 110 which is mounted in a microactuator (not separately illustrated in FIG. 1) for accessing data on a disc surface. In the example shown in FIG. 1, sliders 110 are supported in microactuators that are mounted to suspensions 112 which are in turn attached to track accessing arms 114 of a positioning motor 116. The positioning motor 116 shown in FIG. 1 is of the type known as a rotary moving coil actuator and includes a voice coil, shown generally at 118. Voice coil 118 rotates positioning motor 116 with its attached heads 110 about a pivot shaft 120 to position heads 110 over a desired data track along an arcuate path 122 between a disc inner diameter 124 and a disc outer diameter 126. Voice coil motor 118 is driven by a servo controller 130 based on signals generated by heads 110 and a host computer (not shown) and also based on relative position outputs from the microactuators. The servo controller 130 also provides a microactuator drive to the microactuator. The disc drive 100 is explained in more detail below in connection with an example shown in FIG. 2.

Figure 2:
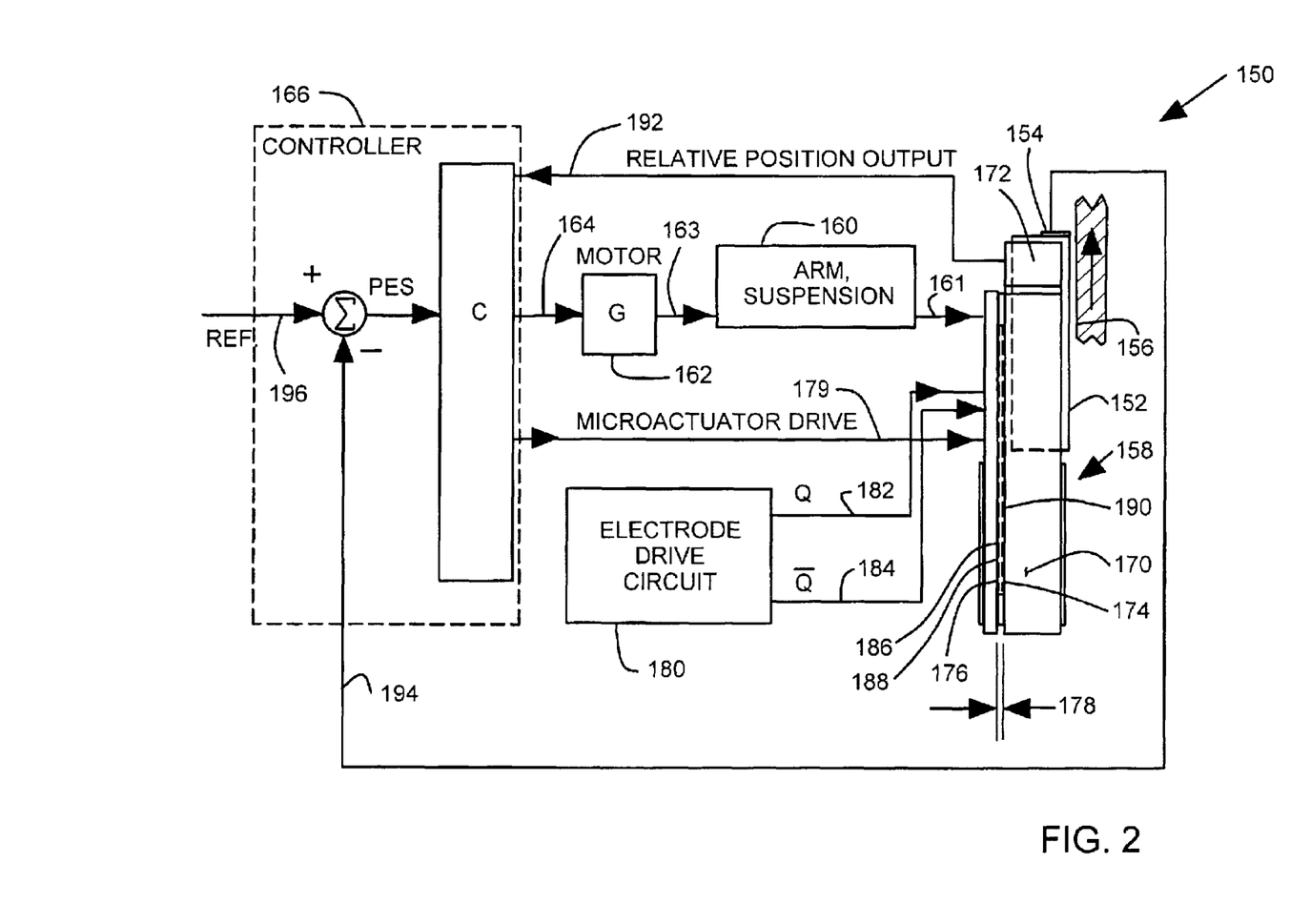
FIG. 2 illustrates a block diagram of a disc drive.

FIG. 2 illustrates a block diagram of a disc drive 150. The disc drive 150 includes a read/write head 152 that includes a thin film read/write transducer 154 accessing data on a disc surface 156. The read/write head 152 is mounted to a microactuator 158. The microactuator 158 includes a first microactuator component 170 that mounts to a suspension and arm 160 that are positioned by a positioning motor 162. The positioning motor 162 receives a motor drive current 164 from a controller 166 and exerts a positioning force 163 on the arm and suspension 160. The arm and suspension 160, in turn exert a positioning force 161 on the first microactuator component 170. Movement of the positioning motor 162 is encumbered by a relatively large mass that includes the arm and suspension 160, the complete microactuator 158 and the read/write head 152. The motion of the positioning motor 162 is also encumbered by resistance to motion from flex cables (not illustrated) that are attached between the arm and circuitry such as the controller 166. The frequency response of the positioning motor 162 is relatively slow and somewhat unpredictable. Motion of the microactuator 158, however, is encumbered only by a relatively smaller mass including only the read/write head 152 and a second microactuator component 172 that mounts to the read/write head 152. The frequency response of the microactuator 158 is relatively fast.

The first and second microactuator components 170, 172 have insulating deposits 174, 176 that are spaced apart by an air gap 178 and laterally movable relative to one another responsive to a microactuator electrical drive current 179. The read/write head 152 is laterally movable responsive to the arm and suspension 160 by the microactuator electrical drive current 179.

An electrode drive circuit 180 provides first and second electrode drive voltages, Q and /Q at 182, 184. First and second drive electrode deposits 186, 188 (indicated by a dashed line in FIG. 2) are interdigitated and flat. The drive electrode deposits 186, 188 receive the first and second electrode drive voltages 182, 184 respectively. A sense electrode deposit 190 (indicated by a dashed line in FIG. 2) is digitated, flat and provides a relative position output 192. The drive and sense electrode deposits 186, 188, 190 are disposed on the insulating deposits 174, 176. The sense electrode deposit 190 faces the drive electrode deposits 186, 188 across the air gap 178. The insulating deposits 174, 176 and the sense and drive electrode deposits 186, 188, 190 are explained in more detail below in connection with examples shown in FIGS. 3–7.

The controller 166 receives a position output 194 from the read/write transducer 154 and also receives the relative position output 192. The controller provides the motor drive current 164 and the microactuator electrical drive current 179. The controller 166 controls the position of the read/write head 152 by providing larger, slower positioning motions using positioning motor 162 and smaller, faster positioning motions using microactuator 158. The controller controls based on absolute position data provided by position output 194 and based on relative position data provided by the relative position output 192. The relative position output 192 includes data indicating the relative lateral position of the first and second microactuator components 170, 172 with respect to one another. The relative position output 192 is also indicative of the relative position of the read/write head 152 with respect to the arm and suspension 160. Internally, the controller 166 compares the absolute position output 194 to a reference or desired position 196 that is provided the host computer system (not illustrated).

Figure 3:
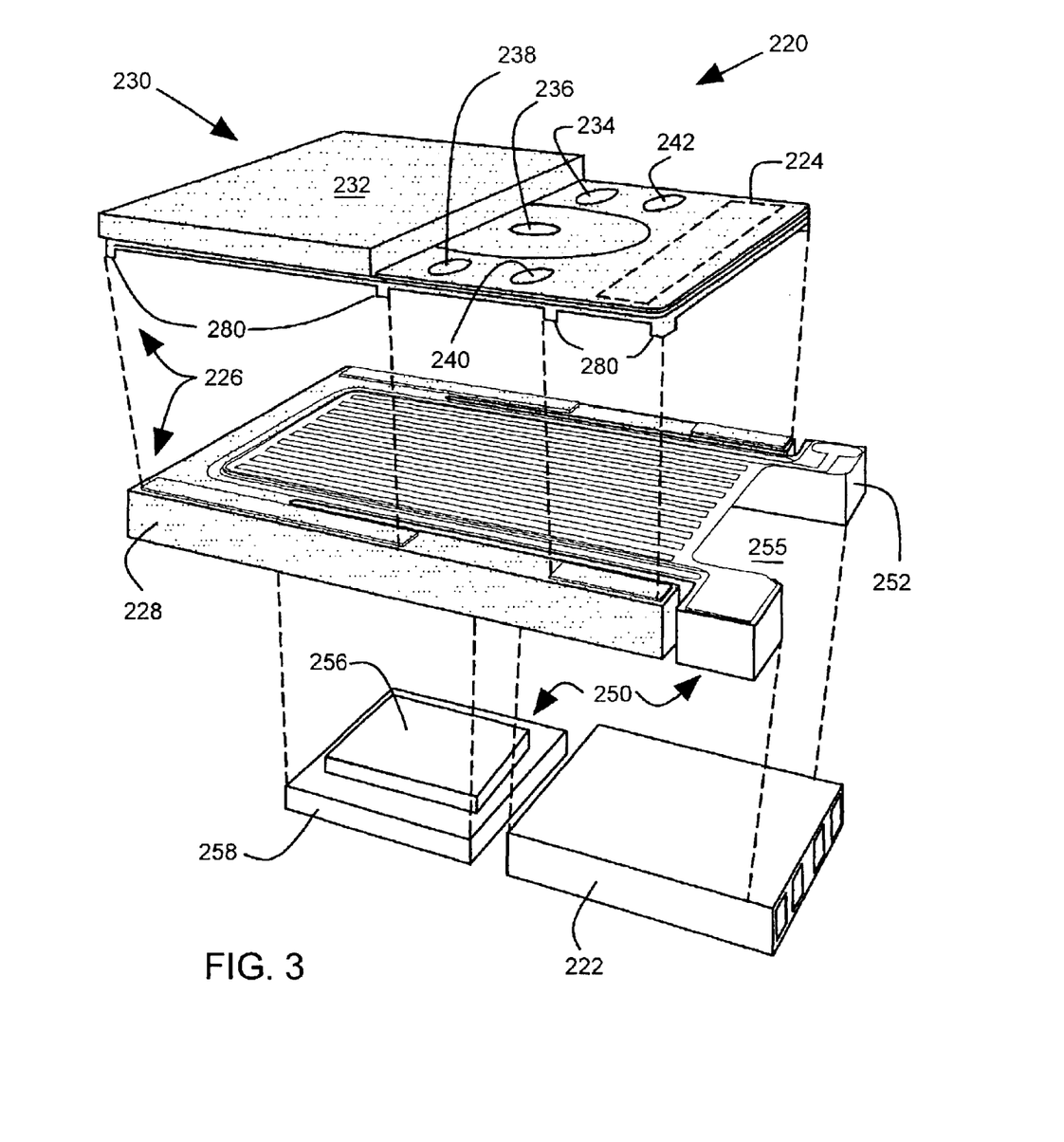
FIG. 3 illustrates an exploded view of a microactuator that provides a relative position output.
Figure 4:
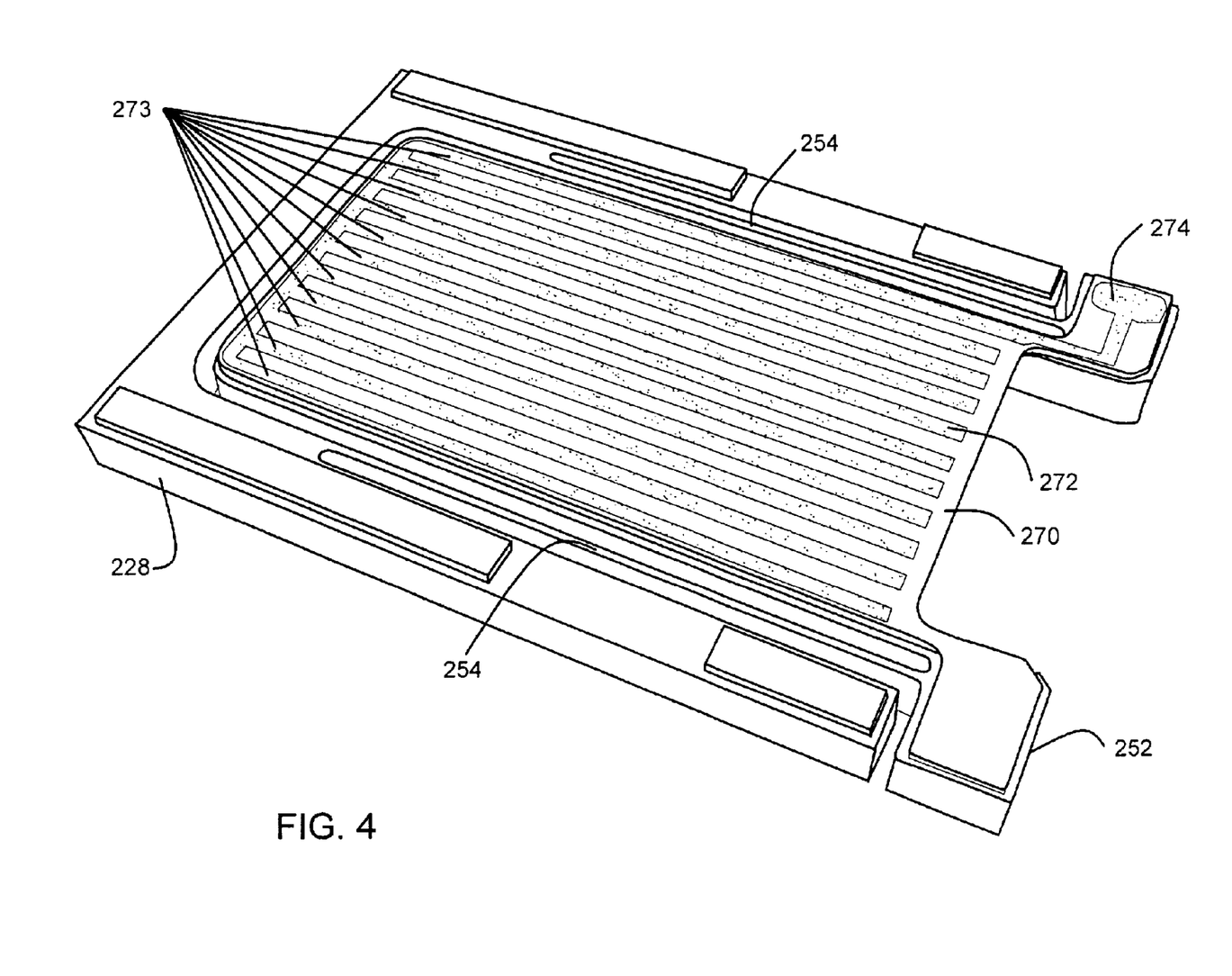
FIG. 4 illustrates a digitated sense electrode deposit in a microactuator.
Figure 5:
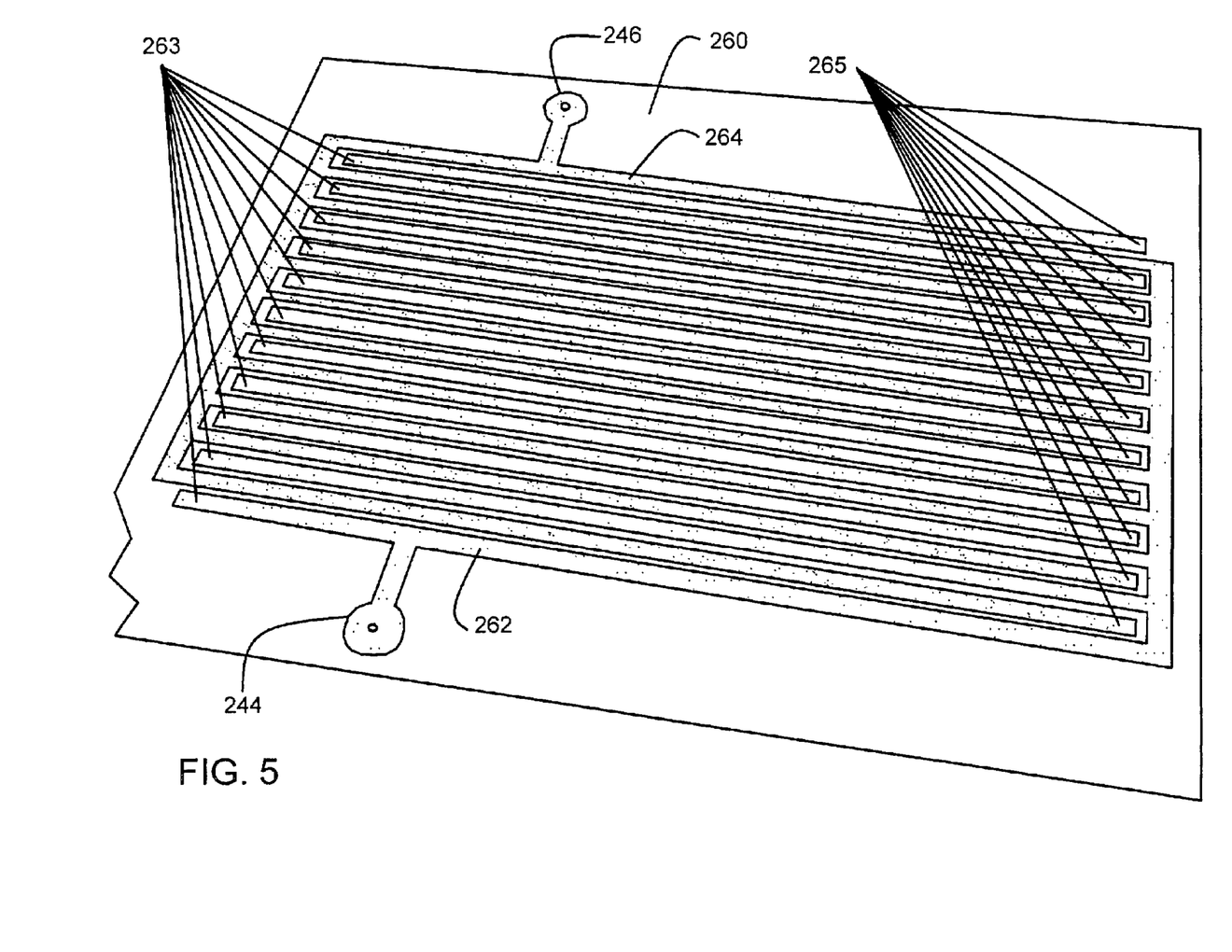
FIG. 5 illustrates interdigitated drive electrode deposits in a microactuator.

FIGS. 3–5 illustrate an example of a microactuator 220 that provides a relative position output. FIG. 3 illustrates an exploded view of the microactuator 220 along with a read/write head 222. FIG. 4 illustrates a portion 228 (three-sided frame) of a first microactuator component 226 joined by interconnecting springs 254 to a second frame 252 of a second microactuator component 250. In a preferred arrangement, the portion 228 and the second frame 252 and the interconnecting springs 254 are formed as a unitary structure by etching them from a wafer as a single block of silicon material. FIG. 5 illustrates features that are hidden from view in FIG. 3, such as drive electrode deposits 262, 264 on an insulating deposit 260.

The microactuator 220 includes a surface 224 (FIG. 3) for mounting the microactuator 220 to a suspension (not illustrated in FIG. 3) using epoxy, adhesive, solder or other known mounting means. The microactuator 220 includes the first microactuator component 226 that is identified in FIG. 3 by dotted surfaces. The first microactuator component 226 includes the three sided frame 228 that is mounted to a top assembly 230. The top assembly 230 includes a top keeper 232 that is formed of soft magnetic material and a microactuator drive coil (hidden from view under the top keeper 232). The microactuator drive coil is connected to coil contact pads 234, 236, 238 for receiving a microactuator electrical drive current as explained above in connection with FIG. 2. The top assembly 230 also includes first and second contacts 240, 242 that are connected by plated feedthroughs (also called vias) to electrical contact pads 244, 246 which are hidden from view in FIG. 3 and shown in FIG. 5.

The microactuator 220 includes the second microactuator component 250. The second microactuator component 250 includes a second frame 252 that is suspended inside the mounting frame 228 on the springs 254. The springs 254 are best illustrated in FIG. 4. The second frame 252 is suspended on the springs 254 and is free to move laterally until one of the springs 254 is pinched between the second frame 252 and the mounting frame 228. The pinching or contact on each side provides a mechanical stop that prevents further lateral movement of the second frame 252 relative to the mounting frame 228. The mechanical stops limit lateral deflection of a sense electrode deposit 272 to certain lateral deflection limits.

The sense electrode deposit 272 includes multiple sense fingers 273. The drive electrode deposit 262 includes multiple first drive fingers 263. The drive electrode deposit 264 includes multiple second drive fingers 265. The second drive fingers 265 are interdigitated with the first drive fingers 263 as illustrated. Each sense finger 273 of the sense electrode deposit 272 overlaps a first drive finger 263 and a second drive finger 265 by a distance greater than the lateral deflection limits such that the relative position output has a monotonic relationship to the lateral deflection. The overlapping of sense fingers 273 and the drive fingers 263, 265, in a microactuator rest position, is also illustrated in another example shown in cross-section in FIG. 6.

The second frame 252 includes a mounting opening 255 for receiving the read/write head 222. A permanent magnet 256 is mounted to a bottom keeper 258. The bottom keeper 258 is in turn mounted to the second frame 252. The top keeper 232, the bottom keeper 258 and the permanent magnet 256 generate a magnetic field. Microactuator drive current in the microactuator drive coil interacts with the magnetic field to laterally deflect the microactuator 220.

The drive and sense electrode deposits 262, 264, 272 are digitated and positioned so that the lateral motion of the microactuator rotor is sensed by the sense electrode deposit 272 and converted to a relative position output proportional to that lateral motion. The drive and sense electrode deposits 262, 264, 272 can be fabricated over an existing microactuator surface so that the overall size of the microactuator is not increased by the addition of the position sensor. The digitated patterns increases capacitance between the sensing electrode deposit 272 and the drive electrode deposits 262, 264. The increases capacitance increases sensitivity to lateral motion and improve performance by decreasing the noise level.

Referring now to FIG. 5, the underside of the top assembly 230 includes the insulating deposit 260 that is flat. First and second metal drive electrode deposits 262, 264 are deposited on the insulating deposit 260. Each of drive deposits 262, 264 is digitated, or in other words, formed to include multiple finger-shaped elements arranged parallel to one another with gaps between the fingers 263, 265. The fingers 263, 265 of the two drive deposits 262, 264 are interleaved or alternated to form an overall pattern of two interdigitated drive electrode deposits 262, 264. The drive electrode deposits 262, 264 are preferably formed by thin film metal deposition.

Referring now to FIG. 4, the top side of the second frame 252 includes an insulating deposit 270 that is flat. The metal sense electrode deposit 272 is deposited on the insulating deposit 270. The sense electrode deposit 272 is digitated, or in other words, formed to include multiple finger shaped elements 273 arranged parallel to one another with gaps between the fingers 273. The sense electrode deposit 272 is preferably formed by thin film metal deposition. The sense electrode deposit 272 is spaced apart from the drive electrode deposits 262, 264 by an air gap which is explained in more detail in connection with FIGS. 6–7 below. The sense electrode deposit 272 also includes a sense contact pad 274 which provides a relative position output. The first and second flat insulating deposits 260, 270 are laterally movable relative to one another responsive to a microactuator electrical drive current.

The drive electrode deposits 262, 264 and the sense electrode deposit 272 are disposed on the insulating deposits 260, 270 with the sense electrode deposit 272 facing both of the drive electrode deposits 262, 264 across the air gap. The sense electrode deposit 272 lies in a sensing electrode plane and the first and second drive electrodes 262, 264 lie in a drive electrode plane, and the sense electrode plane is parallel to the drive electrode plane.

In a preferred arrangement, the microactuator includes standoff spacers 280 between the insulating deposits 260, 270. The standoff spacers 280 control a width of the air gap. The sense electrode deposit 272 can be deposited on the second insulating deposit 270 as shown in FIGS. 3–5. Alternatively, the sense electrode deposit 272 can be deposited on the first insulating deposit 260, in which case the first and second drive electrode deposits 262, 264 are deposited on the second insulating deposit 270.

Figure 6:
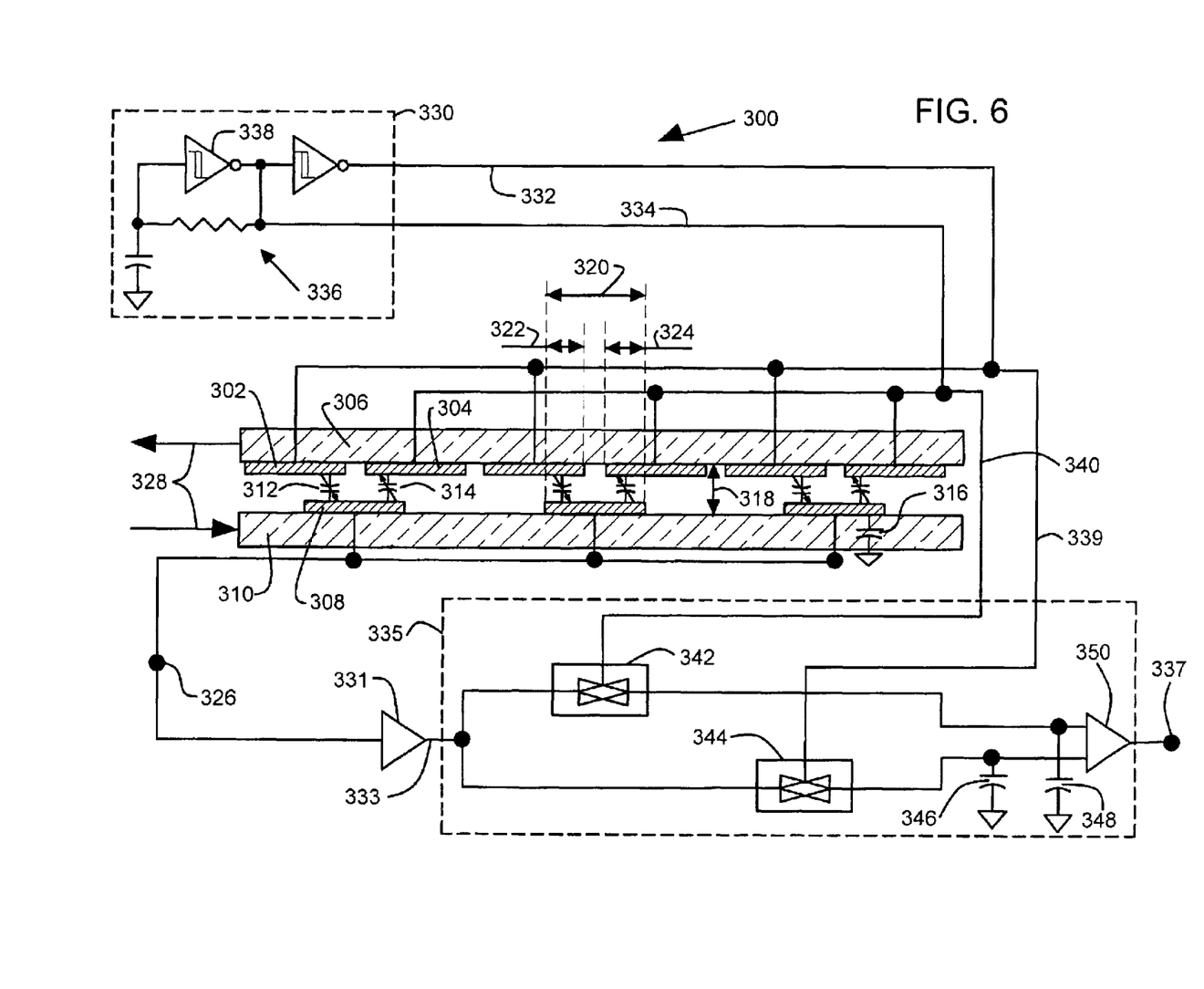
FIG. 6 illustrates a first circuit connected to drive and sense electrode deposits in a microactuator.

FIG. 6 illustrates a first circuit 300 connected to drive electrode deposits 302, 304 on an insulating deposit 306 and connected to a sense electrode deposit 308 on an insulating deposit 310 in a microactuator. The insulating deposit 306 is separated from the insulating deposit 310 by a spacing or air gap 318. The deposits 302, 304, 308 are shown in cross section in FIG. 6 and individual fingers of the digitation of each deposit can be seen. As illustrated, the deposits 302, 304, 308 form variable sense capacitances 312, 314 between the sense electrode deposit 308 and the drive electrodes 302, 304. There is also a parasitic capacitance 316 between the sense electrode deposit 308 and structures underlying the insulating layer 310. The conducting structures underlying the insulating layer are typically grounded as illustrated.

The sense electrode deposit 308 has a width 320 and overlaps both drive electrode deposits 302, 304 by distances 322, 324 that are greater than the lateral deflection limits (described above in connection with FIGS. 3–5) such that a relative position output 326 has a monotonic relationship to the lateral deflection 328.

An electrode drive circuit 330 provides a first electrode drive voltage 332 that is 180 electrical degrees out of phase with a second electrical drive voltage 334. The drive voltages 332, 334 can be sine waves, square wave or other suitable repetitive waveforms that have fixed amplitudes and opposite polarities.

In a preferred arrangement, the electrode drive circuit 330 comprises a free-running oscillator 336. The oscillator 336 preferably includes a Schmitt-trigger inverter 338 with an RC feedback circuit as illustrated in FIG. 6.

The sense electrode deposit 308 provides the relative position output 326 which couples to an input of a buffer amplifier 331. The buffer amplifier 331 provides an amplifier output 333 that is a buffered relative position output. The amplifier output 333 couples to an input of a demodulator 335. The demodulator 335 generates a demodulator output 337 that is a demodulated relative position output. The demodulator 335 is preferably a synchronous demodulator with synchronizing inputs 339, 340 coupling to the first and second electrode drives 332, 334. The synchronous demodulator includes solid state switches 342, 344, capacitors 346, 348 and a differential amplifier 350.

The arrows 328 illustrate lateral motion of the insulating deposit 306 relative to the insulating deposit 310.

Figure 7:
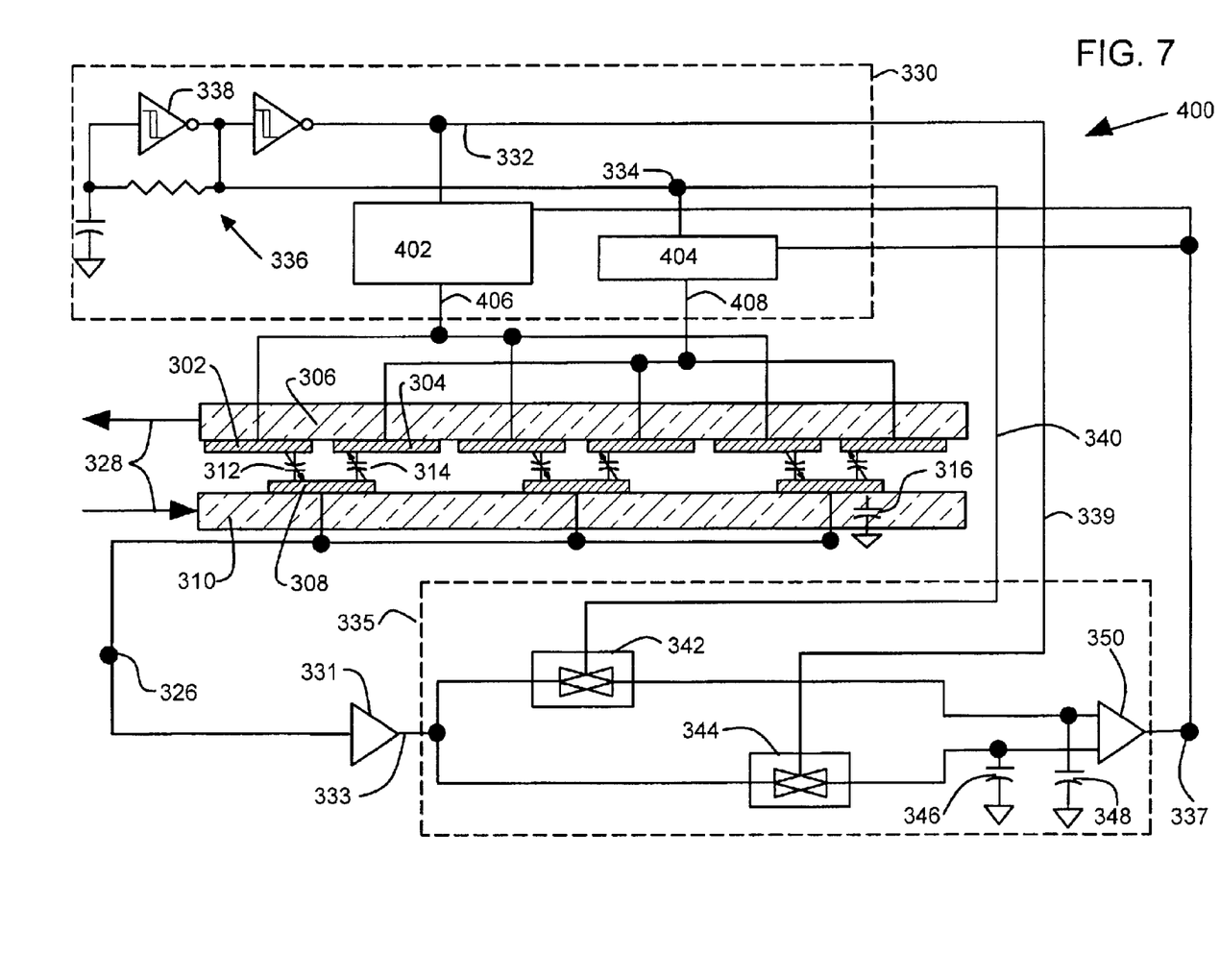
FIG. 7 illustrates a second circuit connected to drive and sense electrode deposits in a microactuator.

FIG. 7 illustrates a second circuit 400 that is similar to the circuit 300 shown in FIG. 6. Reference numbers in FIG. 7 that are the same as reference numbers used in FIG. 6 identify the same or similar features. In FIG. 7, however, first and second voltage controlling circuits 402, 404 are placed between the drive circuit outputs 332, 334 and the first and second drive deposits 302, 304. The voltage controlling circuits 402, 404 provide controlled voltage drive circuit outputs 406, 408. The controlled voltage drive circuit outputs 406, 408 have substantially the same waveform as the drive circuit output 332, 334, except that the amplitude of the controlled voltage drive circuit outputs 406 and 408 are adjusted in amplitude according to the value of the demodulated relative position output 337. One of the controlled voltage drive circuit outputs is increased and the other is decreased by an amount proportional to the amplitude of output 337. The feedback described above automatically reduces the sense electrode deposit voltage 326 to zero, reducing the effects of the stray capacitance 316 on the relative position output 337.

The parasitic capacitance 316 adds a loading factor that decreases the sense electrode signal 326 by a factor that depends on the ratio of the parasitic capacitance 316 to the sensor capacitances 312, 314. If the spacing 318 changes, the sensor capacitances 312, 314 change but the parasitic capacitance 316 remains the same, causing undesirable, erroneous output signal response to the vertical microactuator deflection. The effect of the parasitic capacitance on the output signal can be eliminated or at least greatly reduced by the feedback scheme shown in FIG. 7 where the drive signal amplitudes are adjusted to maintain the sense electrode voltage at zero. This is done by increasing the drive voltage to the drive electrode that the sense electrode has moved away from, and decreasing the drive voltage to the drive electrode that the sense electrode has moved closer toward. Differential amplifier 350 preferably includes an integrator to produce the feedback response as shown in FIG. 7.

With the sense electrode voltage 326 at zero, no charge is transferred to the parasitic capacitance, so that a vertical deflection of the sense electrode no longer generates an undesired output response due to the loading effect of the parasitic capacitance.

In summary, a disc drive (100, 150) comprises a read/write head (110, 152, 222) accessing data on a disc surface (156). A positioning motor (116, 118, 162), an arm with a suspension (112, 114, 160) move responsive to a motor drive current (164).

A microactuator (158, 220) has a first microactuator component (226) mounted to the suspension and has a second microactuator component (250) mounted to the read/write head. The first and second microactuator components have insulating deposits (174, 176, 260, 270, 306, 310) that are flat and spaced apart by an air gap (178, 318) and that are laterally movable responsive to a microactuator electrical drive current (179).

An electrode drive circuit (180, 330) provides first and second electrode drive voltages (182, 184, 332, 334, 406, 408). First and second drive electrode deposits (186, 188, 262, 264, 302, 304) are interdigitated and flat. The drive electrode deposits receive the first and second electrode drive voltages respectively. A sense electrode deposit (190, 272, 308) is digitated, flat and provides a relative position output (192, 326). The drive and sense electrode deposits are disposed on the insulating deposits. The sense electrode deposit faces the drive electrode deposits across the air gap.

A controller (130, 166) receives a position output (194) from the read/write head and receives the relative position output. The controller provides the motor drive current and the microactuator electrical drive current.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the microactuator while maintaining substantially the same functionality without departing from the scope and spirit of the present invention. In addition, although the preferred embodiment described herein is directed to a microactuator with a magnetic drive system, it will be appreciated by those skilled in the art that the teachings of the present invention can be applied to other systems, like capacitive or piezoelectric drive systems, without departing from the scope and spirit of the present invention.

What is claimed is:

1. A microactuator for mounting on a suspension for positioning a read/write head in a disc drive, comprising:
   a first microactuator component having a mounting surface adapted to mount on the suspension;
   a second microactuator component having a mounting opening adapted to receive the read/write head;
   the first and second microactuator components including corresponding first and second insulating deposits that are flat and spaced apart from one another by an air gap, the first and second insulating deposits being laterally movable relative to one another responsive to a microactuator electrical drive current;
   first and second drive electrode deposits that are flat and interdigitated, the drive electrode deposits having corresponding first and second contact pads adapted to receive first and second electrode drive voltages;
   a sense electrode deposit that is flat and digitated, the sense electrode deposit having a sense contact pad providing a relative position output; and
   the drive and the sense electrode deposits being disposed on the insulating deposits with the sense electrode deposit facing both the drive electrode deposits across the air gap.

2. The microactuator of claim 1 wherein the sense electrode deposit lies in a sensing electrode plane and the first and second drive electrodes lie in a drive electrode plane and the sense electrode plane is parallel to the drive electrode plane.

3. The microactuator of claim 1, further comprising standoff spacers between the insulating deposits, the standoff spacers controlling a width of the air gap.

4. The microactuator of claim 1, wherein the sense electrode deposit is disposed on the first insulating deposit.

5. The microactuator of claim 1 wherein the sense electrode deposit is disposed on the second insulating deposit.

6. The microactuator of claim 1 having mechanical stops that limit lateral deflection of the sense electrode deposit to lateral deflection limits, and the sense electrode deposit overlaps both drive electrode deposits by a distance greater than the lateral deflection limits such that the relative position output has a monotonic relationship to the lateral deflection.

7. A disc drive, comprising:
   a read/write head accessing data on a disc surface;
   a positioning motor, an arm and a suspension movable responsive to a motor drive current;
   a microactuator having a first microactuator component mounted to the suspension and having a second microactuator component mounted to the read/write head, the first and second microactuator components having insulating deposits that are flat and spaced apart by an air gap and that are laterally movable responsive to a microactuator electrical drive current;
   an electrode drive circuit providing first and second electrode drive voltages;
   first and second drive electrode deposits that are interdigitated and flat, the drive electrode deposits receiving the first and second electrode drive voltages respectively; and a sense electrode deposit that is digitated, flat and provides a relative position output; the drive and sense electrode deposits being disposed on the insulating deposits, and the sense electrode deposit facing the drive electrode deposits across the air gap;
   a controller receiving a position output from the read/write head and receiving the relative position output, the controller providing the motor drive current and the microactuator electrical drive current.

8. The disc drive of claim 7 wherein the first electrode drive voltage is 180 electrical degrees out of phase with the second electrical drive voltage.

9. The disc drive of claim 7 wherein the first and second electrode drive voltages are square waves.

10. The disc drive of claim 7 wherein the first and second electrode drive voltages are sine waves.

11. The disc drive of claim 7 wherein the electrode drive circuit comprises a free-running oscillator.

12. The disc drive of claim 7 wherein the first and second electrode drive voltages have fixed amplitudes and opposite polarities.

13. The disc drive of claim 7 further comprising a buffer amplifier having a buffer amplifier input coupled to the sense electrode deposit and an amplifier output that is a buffered relative position output.

14. The disc drive of claim 13 further comprising a demodulator having a demodulator input coupled to the buffer amplifier output and having a demodulator output that is a demodulated relative position output.

15. The disc drive of claim 14 wherein the demodulator is a synchronous demodulator with synchronizing inputs, and the synchronizing inputs couple to the first and second electrode drives.

16. The disc drive of claim 14 wherein the electrode drive circuit further comprising first and second voltage controlling circuits controlling the voltages of the first and second electrode drives respectively, the voltages being controlled as a function of feedback from the demodulated relative position output.

17. The disc drive of claim 16 wherein the voltages are controlled to reduce the sense electrode voltage to zero, reducing the effects of the stray capacitance on the relative position output.

18. The disc drive of claim 7, further comprising standoff spacers between the insulating deposits, the standoff spacers maintaining a controlled spacing between the insulating deposits to form the air gap.

19. The disc drive of claim 7, wherein the sense electrode deposit is disposed on the first insulating deposit.

20. The disc drive of claim 7 wherein the sense electrode deposit is disposed on the second insulating deposit.

21. The disc drive of claim 7 wherein the second microactuator component has a maximum lateral deflection relative to the first microactuator component and the sense electrode deposit has a width that is wider than the maximum lateral deflection to provide a monotonic relationship between lateral deflection and the relative position output.

22. A circuit for use in a disc drive to support a microactuator having inputs for receiving a microactuator electrical drive current and electrical drive voltages and having an output providing a lateral position output, comprising:

an electrode drive circuit having a free-running oscillator providing first and second electrode drive voltages that are 180 electrical degrees out of phase with one another; and a controller receiving the relative position output, the controller providing the microactuator electrical drive current; and a buffer amplifier having a buffer amplifier input coupled to the relative position output, the buffer amplifier having an amplifier output that is a buffered relative position output.

23. The circuit of claim 22 further comprising a demodulator having a demodulator input coupled to the amplifier output and having a demodulator output that is a demodulated relative position output.

24. The circuit of claim 23 wherein the demodulator is a synchronous demodulator with synchronizing inputs, and the synchronizing inputs couple to the first and second electrode drives.

25. The disc drive of claim 23 wherein the electrode drive circuit further comprising first and second voltage controlling circuits controlling the voltages of the first and second electrode drives respectively, the voltages being controlled as a function of feedback from the demodulated relative position output.

* * * * *